United States Patent
Mane et al.

(10) Patent No.: US 7,849,112 B2
(45) Date of Patent: Dec. 7, 2010

(54) USING A FILE HANDLE FOR ASSOCIATING THE FILE WITH A TREE QUOTA IN A FILE SERVER

(75) Inventors: Virendra M Mane, Pune (IN); Jiannan Zheng, Ashland, MA (US)

(73) Assignee: EMC Corporation, Hopkinton, MA (US)

( * ) Notice: Subject to any disclaimer, the term of this patent is extended or adjusted under 35 U.S.C. 154(b) by 2061 days.

(21) Appl. No.: 10/654,137

(22) Filed: Sep. 3, 2003

(65) Prior Publication Data

US 2005/0050107 A1  Mar. 3, 2005

(51) Int. Cl.
G06F 12/00 (2006.01)
G06F 17/30 (2006.01)

(52) U.S. Cl. .................... 707/828; 707/823; 711/205

(58) Field of Classification Search ............. 707/1–10, 707/100–104, 200, 823, 828, 999.205; 711/205
See application file for complete search history.

(56) References Cited

U.S. PATENT DOCUMENTS

| | | | | |
|---|---|---|---|---|
| 5,713,013 A | * | 1/1998 | Black | 707/2 |
| 5,893,140 A | | 4/1999 | Vahalia et al. | 711/118 |
| 6,643,654 B1 | | 11/2003 | Patel et al. | 707/10 |
| 6,714,949 B1 | | 3/2004 | Frey, Jr. | 707/200 |
| 6,985,914 B2 | | 1/2006 | Venkatesh et al. | 707/200 |
| 2003/0009484 A1 | * | 1/2003 | Hamanaka et al. | 707/200 |
| 2003/0140051 A1 | * | 7/2003 | Fujiwara et al. | 707/100 |
| 2004/0107222 A1 | | 6/2004 | Venkatesh et al. | 707/200 |
| 2004/0254936 A1 | * | 12/2004 | Mohamed | 707/10 |

OTHER PUBLICATIONS

Steere et al., "Efficient User-Level File Cache Management on the Sun Vnode Interface," USENIX Summer Conference, Jun. 11-15, 1990, Anaheim, California, pp. 325-331.

Uresh Vahalia, *UNIX Internals: The new frontiers*, Chapter 9, "File System Implementations," Prentice-Hall, Inc., Upper Saddle River, New Jersey, 1996, pp. 261-289.

Callaghan et al., NFS Version 3 Protocol Specification, RFC 1813, Sun Microsystems, Jun. 1995, published at http://www.faqs.org/ftp/rfc/pdf/rfc1813.txt.pdf, 126 pages.

"Filesystem *Manager*—VxFS," http://www.fujitsu-computers.com/Servers/software/ds-mgw-12.html, published at least as early as Oct. 28, 2000, 2 pages.

(Continued)

*Primary Examiner*—Shew-Fen Lin
(74) *Attorney, Agent, or Firm*—Richard Auchterlonie; Novak Druce & Quigg, LLP (57) ABSTRACT

To avoid the need for storing a tree quota identifier attribute for every file in a quota tree, a tree quota identifier is included in the file handle returned by the file server to a client in response to a directory lookup request. The file server discovers that the file is in a quota tree when searching along a path specified by the file pathname and finding a directory having a tree quota identifier. The file server responds to a client request for changing the storage resources used by the file by inspecting the file handle and upon finding the tree quota identifier in the file handle, using the tree quota identifier to index a tree quota database to find usage and limits for the tree quota. The file server checks the limits against any increase in the storage resources for the file, and updates the usage.

28 Claims, 9 Drawing Sheets

OTHER PUBLICATIONS

Andy Watson & Paul Benn, Multiprotocol Data Access: NFS, CIFS, and HTTP, TR3014, Network Appliance, Inc,., http://www.netapp.com/tech_library/3014.html, published at least as early as Jul. 12, 2002, 29 pgs.

Traeger et al., "NFS File Handle Security," Stony Brook University Technical Report FSL-04-03, May 2004, 13 pages.

Stern et al., Managing NFS and NIS, Sec. 7.2, "NFS protocol and implementation," O'Reilly Media, Inc., Sebastopol, CA, Jun. 2001, 7 pages.

"GetFileInformationByHandle," Platform SDK:File Systems, Microsoft Corporation, Redmond, WA, Mar. 2005, 5 pages.

* cited by examiner

FIG. 1

USER QUOTA DATABASE

| USER ID | USAGE | HARD LIMIT | SOFT LIMIT |
|---------|-------|------------|------------|
| ------- | ----- | ---------- | ---------- |
| ------- | ----- | ---------- | ---------- |
| ------- | ----- | ---------- | ---------- |
| ⋮ | ⋮ | ⋮ | ⋮ |

FIG. 2
(PRIOR ART)

GROUP QUOTA DATABASE

| GROUP ID | USAGE | HARD LIMIT | SOFT LIMIT |
|----------|-------|------------|------------|
| -------- | ----- | ---------- | ---------- |
| -------- | ----- | ---------- | ---------- |
| -------- | ----- | ---------- | ---------- |
| ⋮ | ⋮ | ⋮ | ⋮ |

FIG. 3
(PRIOR ART)

TREE QUOTA DATABASE

| TREE QUOTA ID | DIRECTORY FILE HANDLE | USAGE | HARD LIMIT | SOFT LIMIT |
|---------------|-----------------------|-------|------------|------------|
| ------------- | --------------------- | ----- | ---------- | ---------- |
| ------------- | --------------------- | ----- | ---------- | ---------- |
| ------------- | --------------------- | ----- | ---------- | ---------- |
| ⋮ | ⋮ | ⋮ | ⋮ | ⋮ |

USING A FILE HANDLE FOR ASSOCIATING THE FILE WITH A TREE QUOTA IN A FILE SERVER

FIELD OF THE INVENTION

The present invention relates generally to computer data storage, and more particularly, to a tree quota in a file server.

BACKGROUND OF THE INVENTION

In a data network, it is often desirable to set limits on the amount of storage that can be allocated to a particular user, group of users, or to a directory tree in a file system. For example, the Microsoft Office (Trademark) E-mail application for networks has both a soft limit and a hard limit on the size of a user's mailbox on a server. If the total storage consumed by all of the files in a user's mailbox exceeds the soft limit, then the user receives an E-mail saying that the user's mailbox is full, and unless some files are deleted, incoming mail might not be received. Incoming mail will not be received if the hard limit would be exceeded.

File servers have set quotas for the storage used by users and user groups. The file server maintains a quota database having an entry for each quota. For example, an entry in the quota database includes a user or user group ID, a usage value, a hard limit value, and a soft limit value. Upon receipt of a storage access request that would increase the usage, the quota database is accessed to check whether or not a hard or soft limit would be exceeded. If a soft limit would be exceeded, a warning is returned to the user. If a hard limit would be exceeded, then access is denied. If access is granted, the usage is updated.

In a file server, it is relatively easy to provide user or group ID quotas, because it is easy to index the quota database with a user or group ID. In contrast, if a quota is placed on all of the files within a directory tree, then there is an additional problem of determining whether or not a file is within a directory tree having such a quota.

SUMMARY OF THE INVENTION

In accordance with one aspect, the invention provides a method of maintaining quotas for storage resources used by a file server for storing files in selected directory trees of a file system. The method includes the file server responding to a client request specifying a file in the file system by performing a search for the file in the file system, and upon finding that the file is in a directory tree having a quota of the storage resources, returning a file handle including a tree quota identifier identifying the quota of the directory tree. The method further includes the file server responding to a client request for increasing storage resources used by the file, the client request for increasing storage resources used by the file including the file handle, the file server responding to the client request for increasing storage resources used by the file by inspecting the file handle and upon finding the tree quota identifier in the file handle, using the tree quota identifier to find the quota identified by the tree quota identifier, and checking whether the client request for increasing storage resources used by the file can be satisfied without exceeding the quota identified by the tree quota identifier.

In accordance with another aspect, the invention provides a method of maintaining quotas for storage resources used by a file server for storing files in selected directory trees of a file system. The file server has a tree quota database of usage values of the storage resources and limit values for the storage resources for the selected directory trees of the file system. The usage values and limit values are indexed by tree quota identifiers associated with root directories of the selected directory trees. The method includes the file server responding to a client request specifying a file in the file system by performing a search for the file in the file system, and upon finding that the file is in a directory tree having a quota of the storage resources, returning a file handle including a tree quota identifier identifying the quota of the storage resources. The method further includes the file server responding to a client request for increasing storage resources used by the file. The client request for increasing storage resources used by the file includes the file handle. The file server responds to the client request for increasing storage resources used by the file by inspecting the file handle and upon finding the tree quota identifier in the file handle, using the tree quota identifier to index the tree quota database to find the quota identified by the tree quota identifier, and checking whether the client request for increasing storage resources used by the file can be satisfied without exceeding the limit value of the quota identified by the tree quota identifier; and when the client request for increasing storage resources used by the file can be satisfied without exceeding the limit value of the quota identified by the tree quota identifier, increasing the usage for the quota identified by the tree quota identifier, and satisfying the client request.

In accordance with yet another aspect, the invention provides a file server including storage for storing a file system, and a processor programmed for responding to client requests for access to the file system and for maintaining quotas for storage resources used for storing files in selected directory trees of the file system. The processor is programmed for responding to a client request specifying a file in the file system by performing a search for the file in the file system, and upon finding that the file is in a directory tree having a quota of the storage resources, returning a file handle including a tree quota identifier identifying the quota of the storage resources. The processor is further programmed for responding to a client request for increasing storage resources used by the file. The client request for increasing storage resources used by the file includes the file handle. The processor is programmed for responding to the client request for increasing storage resources used by the file by inspecting the file handle and upon finding the tree quota identifier in the file handle, using the tree quota identifier to find the quota identified by the tree quota identifier, and checking whether the client request for increasing storage resources used by the file can be satisfied without exceeding the quota identified by the tree quota identifier.

In accordance with a final aspect, the invention provides a file server including storage for storing a file system, and a processor programmed for responding to client requests for access to the file system and for maintaining quotas for storage resources used for storing files in selected directory trees of the file system. The processor is programmed for maintaining a tree quota database of usage values of the storage resources and limit values for the storage resources for the selected directory trees of the file system. The usage values and limit values are indexed by tree quota identifiers associated with root directories of the selected directory trees. The processor is programmed for responding to a client request specifying a file in the file system by performing a search for the file in the file system, and upon finding that the file is in a directory tree having a quota of the storage resources, returning a file handle including a tree quota identifier identifying the quota of the storage resources. The processor is further programmed for responding to a client request for increasing storage resources used by the file, the client request for increasing storage resources used by the file including the file handle, the processor responding to the client request for increasing storage resources used by the file by inspecting the file handle and upon finding the tree quota identifier in the file handle, using the tree quota identifier to index the tree quota database to find the quota identified by the tree quota identifier, and checking whether the client request for increasing storage resources used by the file can be satisfied without exceeding the quota of storage resources for storing files in the directory tree identified by the tree quota identifier; and when the client request for increasing storage resources used by the file can be satisfied without exceeding the limit value of the quota identified by the tree quota identifier, increasing the usage for the quota identified by the tree quota identifier, and satisfying the client request.

BRIEF DESCRIPTION OF THE DRAWINGS

Additional features and advantages of the invention will be described below with reference to the drawings, in which.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

Figure 1:
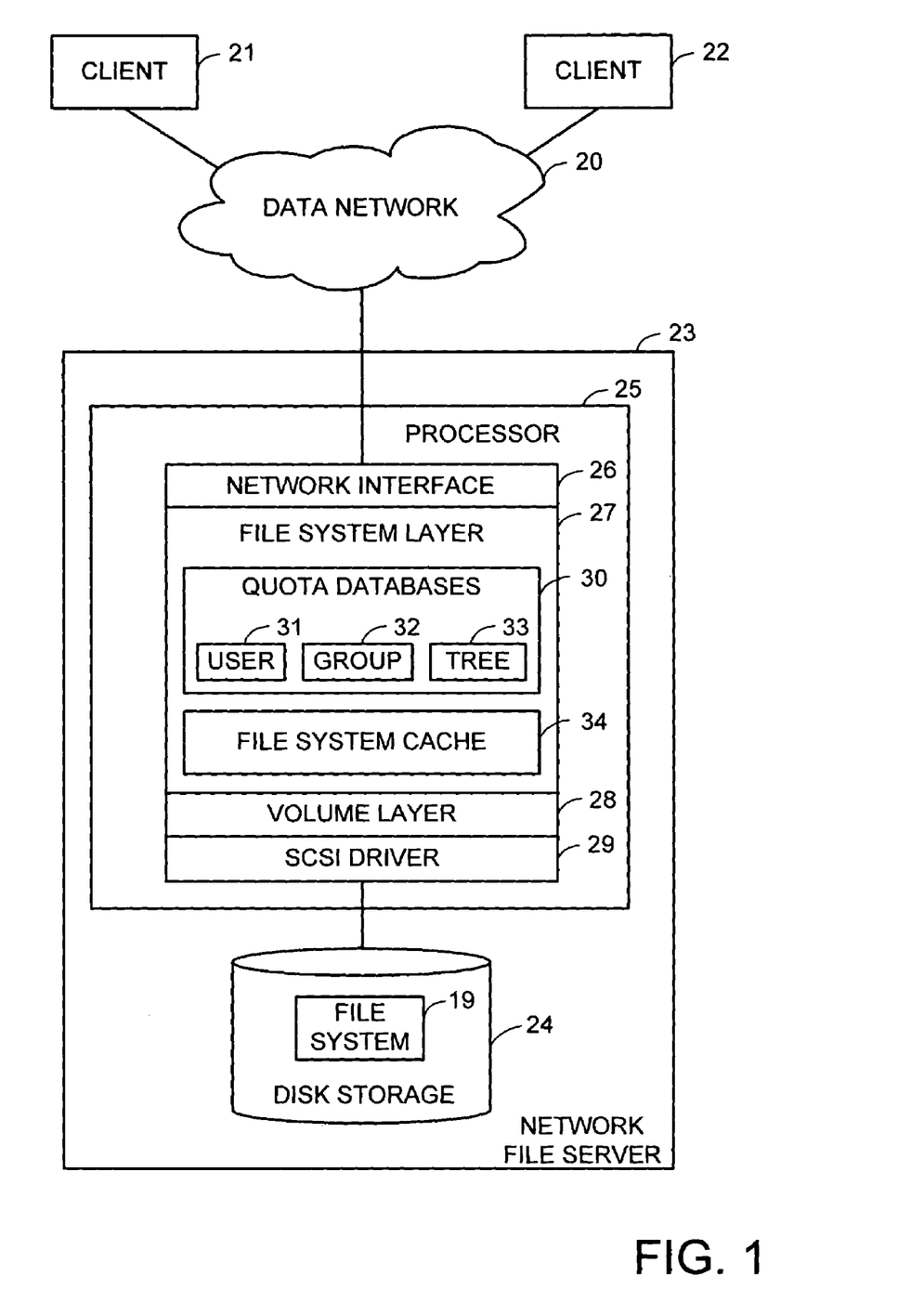
FIG. 1 is a block diagram of a data network including clients that share a network file server.

With reference to FIG. 1, there is shown a data network 20 linking clients 21, 22 to a network file server 23. The network file server 23 includes disk storage 24 such as one or more disk drives, and a processor 25 programmed for responding to client requests for access to the storage.

The processor 25 includes a number of program layers, including a network interface 26 for coupling to the data network, a file system layer 27 for organizing data into a hierarchical file system of files and directories, a volume layer 28 for organizing the data into logical volumes of data blocks, and a Small Computer System Interface (SCSI) driver 29 for linking the volume layer 28 to the disk storage 24.

The file system layer 27 provides access to a file system 19 in the disk storage 24. A suitable file system is the UNIX file system, as described in Chapter 9, pp. 261-289 of Uresh Vahalia, *Unix Internals*: The New Frontiers, 1996, Prentice Hall, Inc., Simon & Schuster, Upper Valley River, N.J. 07458. The file system layer 27 also manages quota databases 30 including a user quota database 31, a group quota database 32, and a tree quota database 33. The file system layer 27 also maintains a file system cache 34 in random access memory of the processor 25. The operation of the file system cache 34 is described in Vahalia et al. U.S. Pat. No. 5,893,140 issued Apr. 6, 1999, entitled "File Server Having a File System Cache and Protocol for Truly Safe Asynchronous Writes," incorporated herein by reference.

Figure 2:
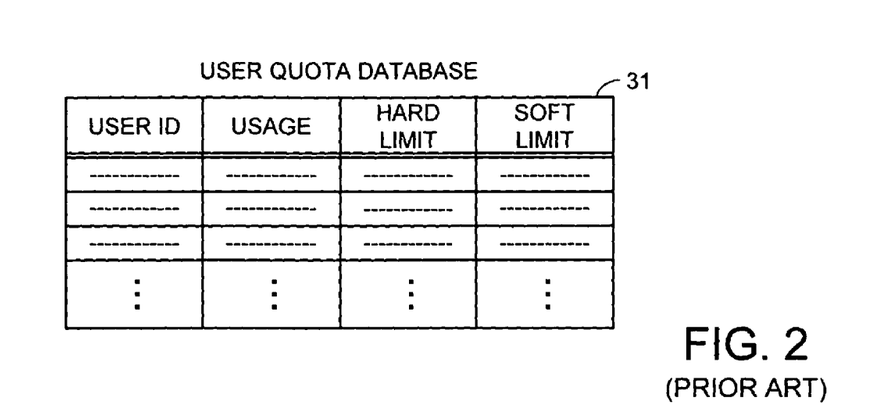
FIG. 2 is a block diagram of a user quota database introduced in FIG. 1.

As shown in FIG. 2, the user quota database 31 has an entry for each user having a quota. Each entry includes a user ID, a usage value, a hard limit value, and a soft limit value. The user quota database 31 may include additional entries, such as a usage and hard and soft limits on the number of files allocated to a user in addition to the usage and hard and soft limits on the total storage space (e.g., bytes of storage or file system blocks) allocated to the user.

Figure 3:
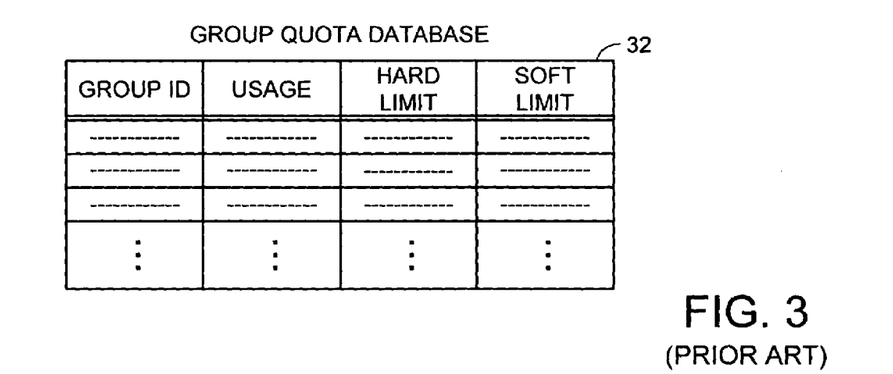
FIG. 3 is a block diagram of a group quota database introduced in FIG. 1.

As shown in FIG. 3, the group quota database 32 has an entry for each user group having a quota. Each entry includes a group ID, a usage value, a hard limit value, and a soft limit value. The group quota database 31 may include additional entries, such as a usage and hard and soft limits on the number of files allocated to the user group in addition to hard and soft limits on the total storage space (e.g., bytes of storage or file system blocks) allocated to the user group.

Figure 4:
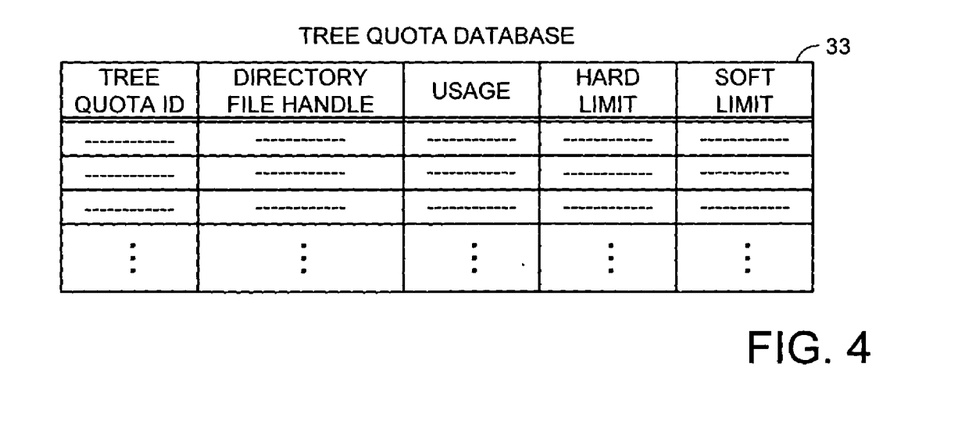
FIG. 4 is a block diagram of a tree quota database introduced in FIG. 1.

As shown in FIG. 4, the tree quota database 33 has an entry for each directory tree having a quota. Each entry includes a tree quota ID, a directory file handle of the root directory of the directory tree, a usage value, a hard limit value, and a soft limit value. In addition, each entry could include a path name for the root directory of the directory tree. Each entry could also include a usage and hard and soft limits on the number of files included in the directory tree in addition to the hard and soft limits on the total storage space (e.g., bytes of storage or file system blocks) of the files in the directory tree. The tree quota ID is a primary key for indexing the tree quota database. A unique quota tree ID is used for each quota tree in the file system.

The present invention relates to the problem of associating each tree quota ID with all of the files that happen to be in the directory tree having the tree quota identified by the tree quota ID. The tree quota ID need only be an identifier for indexing the entries in the tree quota database. Each time that the file server grants a client request to change the size of a file, the file server determines whether the file is in a directory tree having a tree quota, and if so, the file server must find the tree quota ID in order to index the tree quota database to update the usage. Moreover, if the size of the file is to be increased, the file server also checks the soft and hard limits to determine whether or not to issue a warning message or deny the request.

Determining whether or not a file is in a quota tree could become a very slow operation if on each write operation, it would be necessary to search the directory hierarchy to check whether a directory is found having a tree quota. For a network file access protocol that uses file handles, such as the Network File System (NFS), there would be additional overhead in determining the current location or path of the file in the file system hierarchy. One solution to this problem would be to store a tree quota ID in association with the file inode of each file included in the directory tree having the tree quota. But this solution would need modification to the file system inode and would also make operations like moving a directory tree and turning the tree quota off a slow and difficult operation. To turn the tree quota off, a large number of tree quota identifiers would need to be cleared from all of the inodes in the quota tree by recursively traversing the directory.

Figure 5:
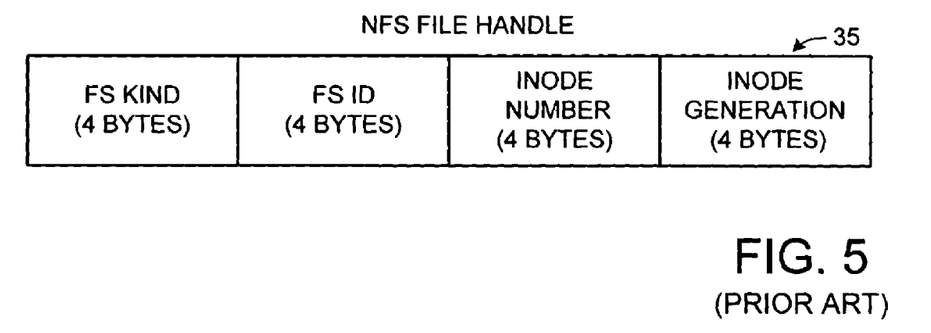
FIG. 5 is a block diagram of a "prior-art" Network File System (NFS) file handle.

The preferred solution to the problem of associating each quota tree ID with the files in the quota tree is to modify the file handle of a file in a quota tree so that the file handle includes the quota tree ID. For example, FIG. 5 shows a "prior art" NFS file handle. This NFS file handle includes four bytes identifying the kind of the file system including the file, a four-byte file system ID identifying the file system including the file, a four-byte inode number of the file, and a four-byte inode generation count for the file. In general, the NFS file handle before modification may have various configurations. The file handle simply contains all the information the server needs to distinguish an individual file. To the client, the file handle is opaque. (See NFS Version 3 Protocol Specification, RFC 1813, Sun Microsystems, June 1995.)

Figure 6:
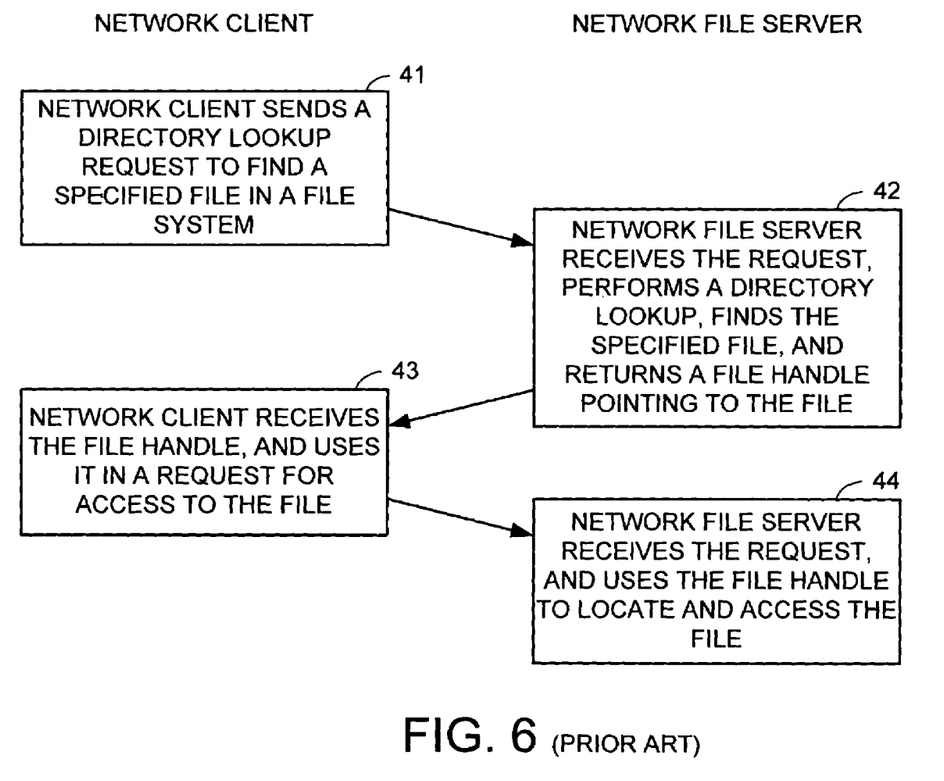
FIG. 6 is a flowchart showing the conventional use of an NFS file handle.

The file handle is used in a conventional network protocol as shown in FIG. 6. In a first step 41, a network client sends a directory lookup request to find a specified file in a file system. In step 42, the network file server receives the request, performs a directory lookup, finds the specified file, and returns a file handle pointing to the file. In step 43, the network client receives the file handle, and uses the file handle in a request to access the file. In step 44, the network file server receives the request, and uses the file handle to locate and access the file.

In order to insert a tree quota ID into the file handle, the tree quota ID is associated with the root directory of the quota tree in the file system directory hierarchy. As further described below, this can be done without actually changing the on-disk file system (inode) structure. Shown in FIG. 7, for example, is such a file system directory hierarchy. The file system directory hierarchy begins with a file system root directory having a name "C:" that is a drive identifier. A drive identifier is terminated with a colon. The file system root directory includes a file 52 named "F1", a directory 53 named "D1" and a directory 56 named "D2". The directory 53 named "D1" contains a file 54 named "F2" and a file 55 named "F3".

Figure 7:
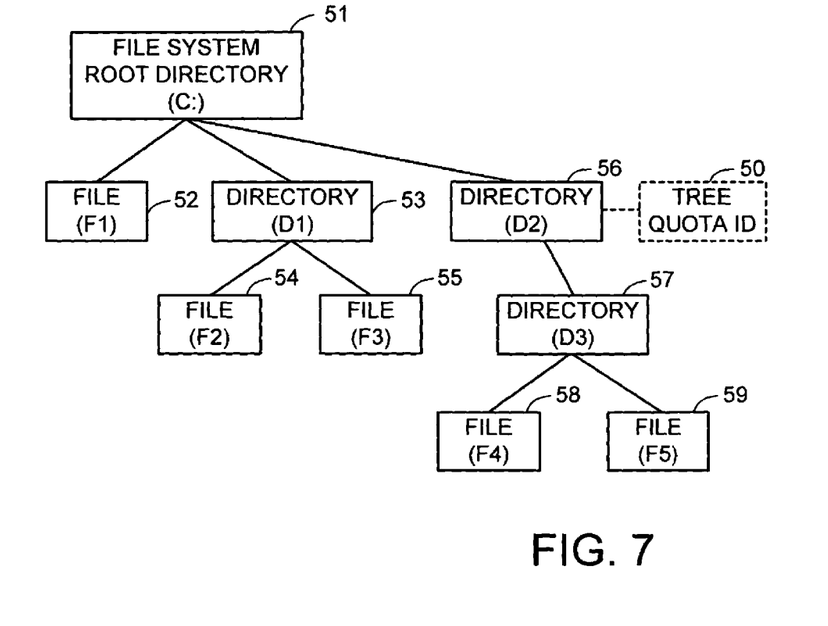
FIG. 7 is a block diagram of a file system hierarchy, including a directory tree associated with a tree quota identifier.

The directory 56 named "D2" has an associated tree quota ID 50. The tree quota ID 50, for example, is an attribute of the directory 56 and is included in a vnode of the directory 56 that is accessed when searching the directory 56 during a directory lookup. The vnode is an in-memory structure associated with the directory 56. When a tree quota is enabled, this vnode is pinned in the file system cache memory. This is done by not releasing the reference to the vnode so long as the file system is mounted. Thus the quota tree root directory vnode is always present in memory. When this directory 56 is looked up for a file, the vnode is already present and has the tree quota ID 50 assigned. When a directory is found that has a tree quota ID assigned, this tree quota ID gets assigned to any child of the directory. This tree quota ID is then used when building the file handle, which is returned to the client.

In FIG. 7, the directory 56 contains a directory 57 named "D3". The directory "D3" contains a file 58 named "F4" and a file 59 named "F5". The tree quota ID 50 therefore identifies the directory 56 as the root directory of a quota tree including the directory 56, the directory 57, the file 58, and the file 59.

To perform the directory lookup in order to return a file handle, the network file server receives from the network client a pathname for the file. The pathname for the file 58, for example, is "C:/D2/D3/F4". To search for the file "C:/D2/D3/F4", for example, the network file server starts at the file system root directory 51, finds the directory 56 in the file system root directory, then accesses the directory 56, find that the tree quota ID 50 is an attribute of the directory 56, finds the directory 57 in the directory 56, accesses the directory 57, and finds that the file 58 is included in the directory 57. When the tree quota ID 50 is found to be an attribute of the directory 57, At this point, the network file server has found the location of the file 58 in the file system hierarchy and has also discovered that the file 58 is in the quota tree associated with the tree quota ID 50. Therefore, the network file server has all of the information needed to produce a NFS file handle including the tree quota ID 50.

Figure 8:
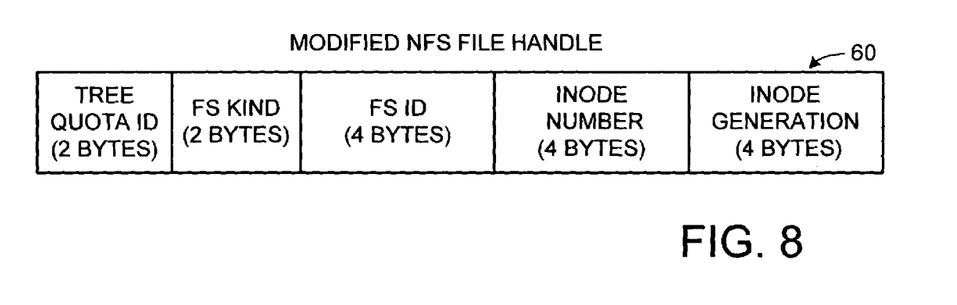
FIG. 8 is a block diagram of a modified NFS file handle including a tree quota identifier.

As shown in FIG. 8, a modified NFS file handle 60 is produced by inserting a tree quota ID in the two most significant bytes of the NFS file handle format of FIG. 5.

Figure 9:
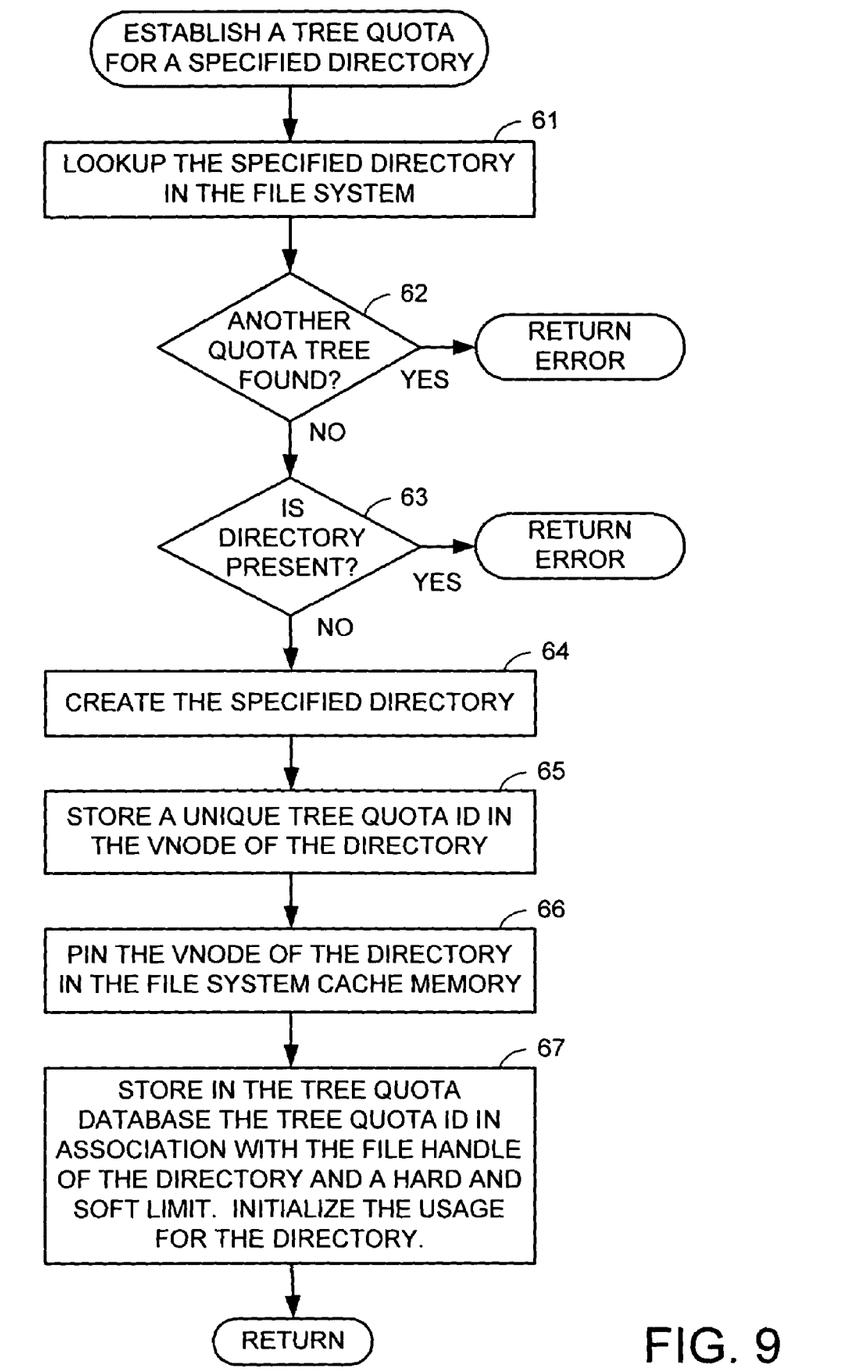
FIG. 9 is a flowchart of a procedure for establishing a tree quota for a specified directory.

FIG. 9 shows a procedure for establishing a tree quota for a specified directory. In a first step 61, the file system hierarchy (e.g., FIG. 7) is searched for the specified directory, beginning with the root directory (e.g., 51 in FIG. 7). In step 62, if another quota tree is found during this search, execution returns with an error. An error is returned because the modified NFS file handle format 60 of FIG. 8 stores no more than one tree quota ID. As a matter of convenience and design choice, in the preferred implementation, each file may reside in no more than one quota tree, so that nesting of quota trees is not permitted. Alternatively, the file handle could be enlarged to provide space for multiple tree quota IDs, so that some nesting of quota trees could be permitted at the expense of the enlargement of the file handle and additional programming complexity.

In step 63, if the directory is present, then execution returns with an error. In the preferred implementation, a tree quota may only be created during creation of a new directory. If a tree quota is created for an existing directory, then there is the possibility that the network file server may already have given network clients file handles for files in the directory tree. If a tree quota were created upon an existing directory and the network file server would happen to receive a file access request including a file handle previously given to a network client for a file in the new quota tree, then the file handle would not include a tree quota ID for the new quota tree directory, and consequently the quota mechanism would be inoperative for this particular file access request. Preferably, these problems are avoided by permitting a tree quota to be established only at the time of creation of the root directory of the quota tree.

In step 64, the specified directory is created. In step 65, a unique tree quota ID is stored in the virtual node ("vnode") of the directory. For example, in FIG. 7, the tree quota ID 50 is stored in a virtual node represented by the box in dashed lines. This is done to associate the tree quota ID with the directory, so that the tree quota ID becomes an attribute of the directory that is easily accessible during a search of the file system hierarchy. Each directory or other file in the file system hierarchy has such a vnode of attributes that may be easily accessed during the search for a specified file in the file system hierarchy.

In step 66, the vnode of the directory is "pinned" in the file system cache memory. In other words, if a free file system cache memory block is needed, the file system cache block including the vnode containing the tree quota ID would be excluded from the set of cache blocks that may be de-allocated for re-use. For example, the cache block address of each cache block that may be deallocated for re-use is kept on a "least recently used" list, and in this case, the vnode of the directory is "pinned" by placing the vnode in a cache block and removing the address of this cache block from the "least recently used" list. By pinning the vnode of the directory in the file system cache memory, search time for finding the tree quota ID associated with the directory is minimized because there will be no need to stage the vnode from the on-disk file system (19 in FIG. 1) to the file system cache 34.

In step 67 a new entry for the tree quota is stored in the tree quota database (33 in FIG. 4). The tree quota ID is stored in association with the file handle of the directory and a hard and soft limit. In addition, the usage for the directory is initialized in the tree quota database entry. The initial value for the usage, for example, is the present size of the directory, since initially there are no other files in the directory tree. After step 67, execution returns.

Figure 10:
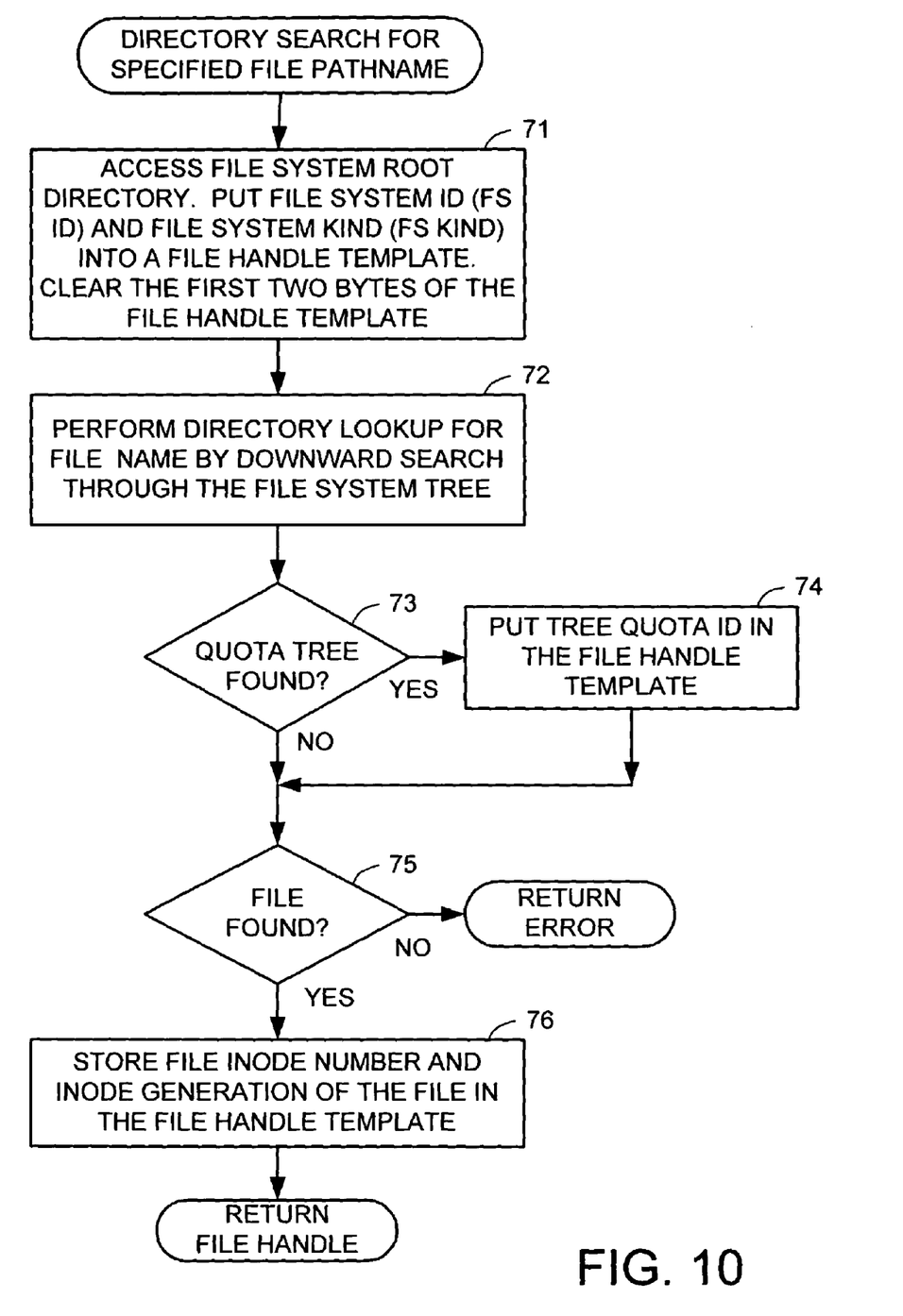
FIG. 10 is a flowchart of a directory search for a file specified by a pathname in the file system.

FIG. 10 shows a directory search for a file specified by a pathname in the file system. In a first step 71, the file system root directory is accessed. The file system identifier (FS ID) and the file system kind (FS KIND) are obtained from the file system root directory, and placed into a file handle template. The first two bytes of the file handle template (the space reserved for any tree quota ID) are cleared.

In step 72, the file system is searched for a specified file pathname by a downward search through the file system tree. The file name, for example, is the path name for the file. The pathname specifies the path in the file system hierarchy from the root directory of the file system downward through any subdirectories to the file. The directories visited during this search are inspected for any associated tree quota ID. In step 72, if a tree quota ID is found during this search, then execution branches from step 73 to step 74 to put the tree quota ID in the file handle template. If the specified file is not found as a result of the search, then execution returns with an error. Otherwise, execution continues to step 76. In step 76, the file inode number and inode generation of the file are stored in the file handle template. After step 76, execution returns with the file handle for the specified file.

Figure 11:
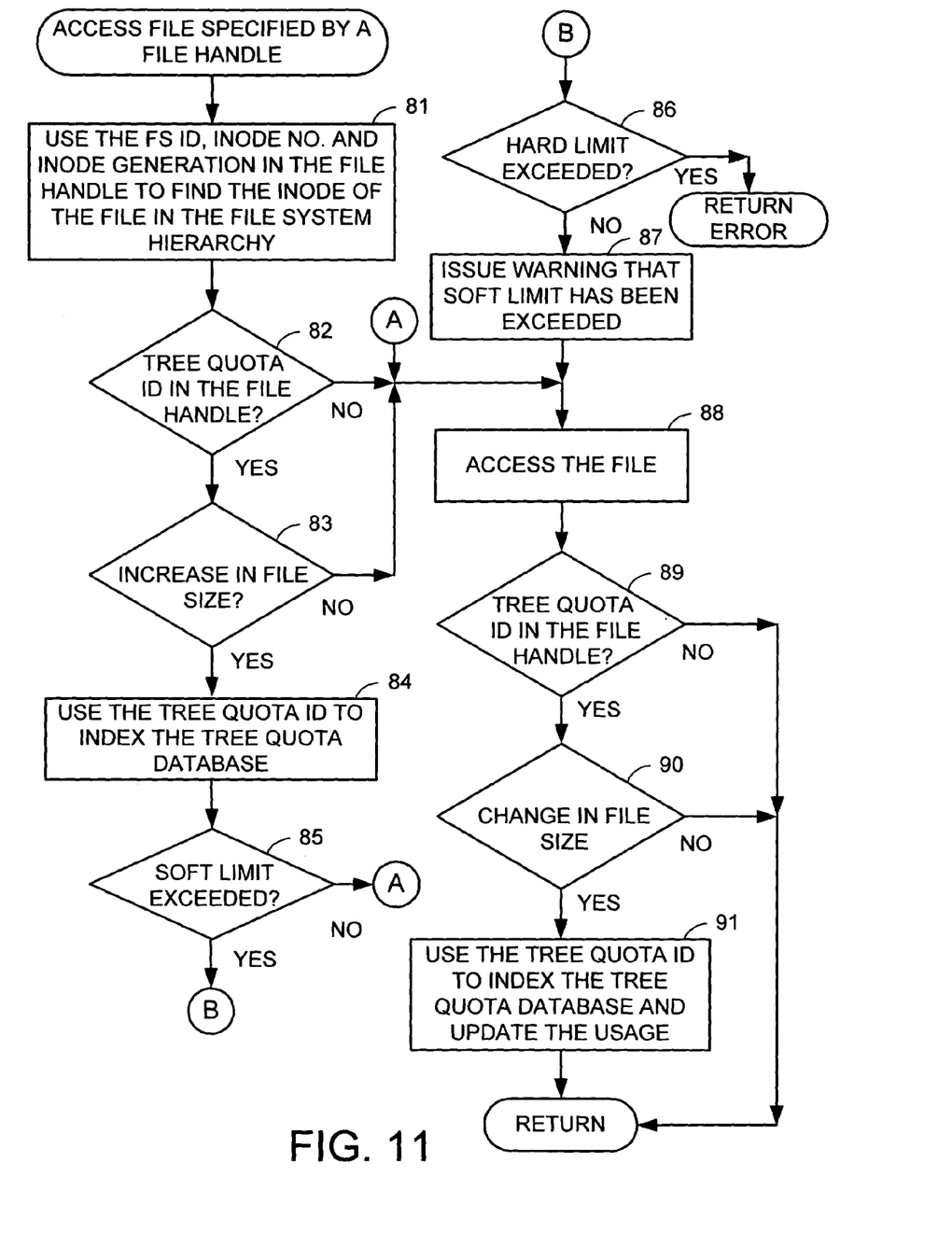
FIG. 11 is a flowchart of a procedure for access to a file specified by a file handle.

FIG. 11 shows a procedure for access to a file specified by a file handle. In the first step 81, the file system identifier, the inode number, and the inode generation in the file handle are used to find the inode of the object in the file system hierarchy. In step 82, if there is a tree quota ID in the file handle, then execution continues to step 83. In step 83, if the file is being accessed to increase its size, then execution continues to step 84. In step 84, the tree quota ID is used to index the tree quota database. In step 85, if the soft limit would be not be exceeded by the requested access to the file, then execution branches to step 88. Otherwise, execution continues from step 85 to step 86. In step 86, if the hard limit would be exceeded by the requested access to the file, then execution returns with an error. Otherwise, execution continues to step 87 to issue a warning that the soft limit has been exceeded. Execution continues from step 87 to step 88. Execution also continues to step 88 from step 82 if there is not a tree quota ID in the file handle, and from step 83 if the requested access to the file would not increase the file size.

In step 88, the file is accessed. In step 89, execution returns if there is not a tree quota ID in the file handle. Otherwise, execution continues to step 90. In step 90, execution returns if the requested access to the file did not result in a change in the file size. Otherwise, execution continues to step 91. In step 91, the tree quota ID is used to index the tree quota database and update the usage for the tree quota by the change in the file size. After step 91, execution returns.

Figure 12:
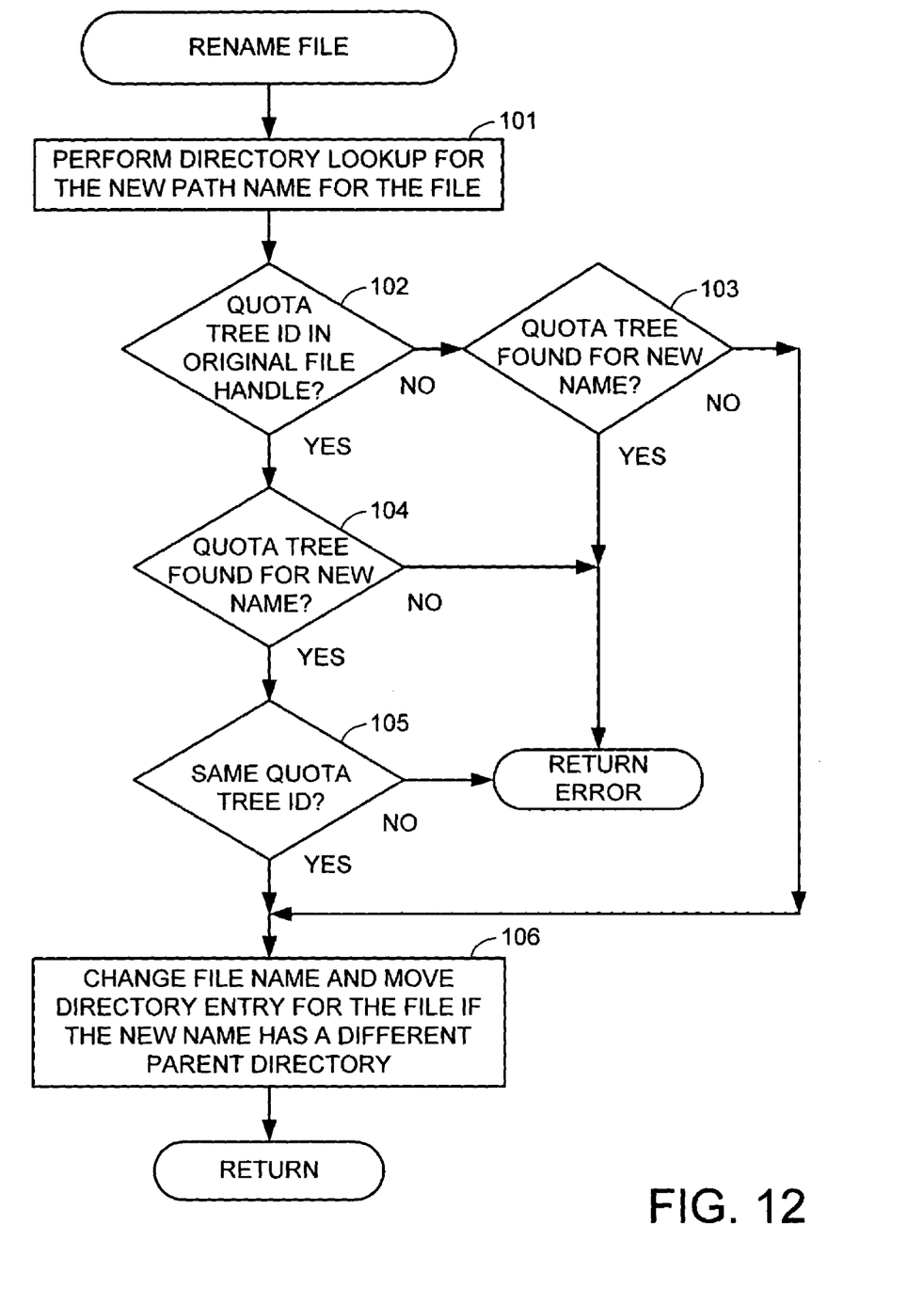
FIG. 12 is a flowchart of a procedure for renaming a file.

FIG. 12 shows a procedure for renaming a file. An issue addressed by this procedure is what should happen when the root directory of a quota tree is renamed. If the renaming of the root directory of a quota tree would cause the root directory of the quota tree to be moved into another quota tree, then this would cause an undesired nesting of quota trees. A preferred way of preventing the renaming of a file from causing an undesired nesting of quota trees is to prevent the renaming of a file from causing a file to be moved into, out of, or between quota trees. In the preferred implementation, the quota are treated as if they were separate file systems by returning a cross-device error if the renaming of a file would otherwise cause a file to be moved into, out of, or between quota trees. For example, in a first step 101 of FIG. 12, a directory lookup is performed for the new path name for the file. In step 102, execution branches to step 103 if there is not a quota tree ID in the original file handle. In step 103, if a quota tree was found for the new name during the directory lookup of step 101, then execution returns an error.

In step 102, if a quota tree ID was found in the original file handle, then execution continues from step 102 to step 104. In step 104, if a quota tree was not found for the new name during the directory lookup of step 101, then execution returns an error. Otherwise, execution continues to step 105. In step 105, if the quota tree ID in the original file handle is not the same as the quota tree ID found for the new name, then execution returns an error. Otherwise, execution continues from step 105 to step 106. Execution also continues to step 106 from step 103 if a quota tree was not found for the new name. In step 106, the name of the file is changed, and the directory entry for the file is moved to a new directory if the new name has a different parent directory. After step 106, execution returns.

Figure 13:
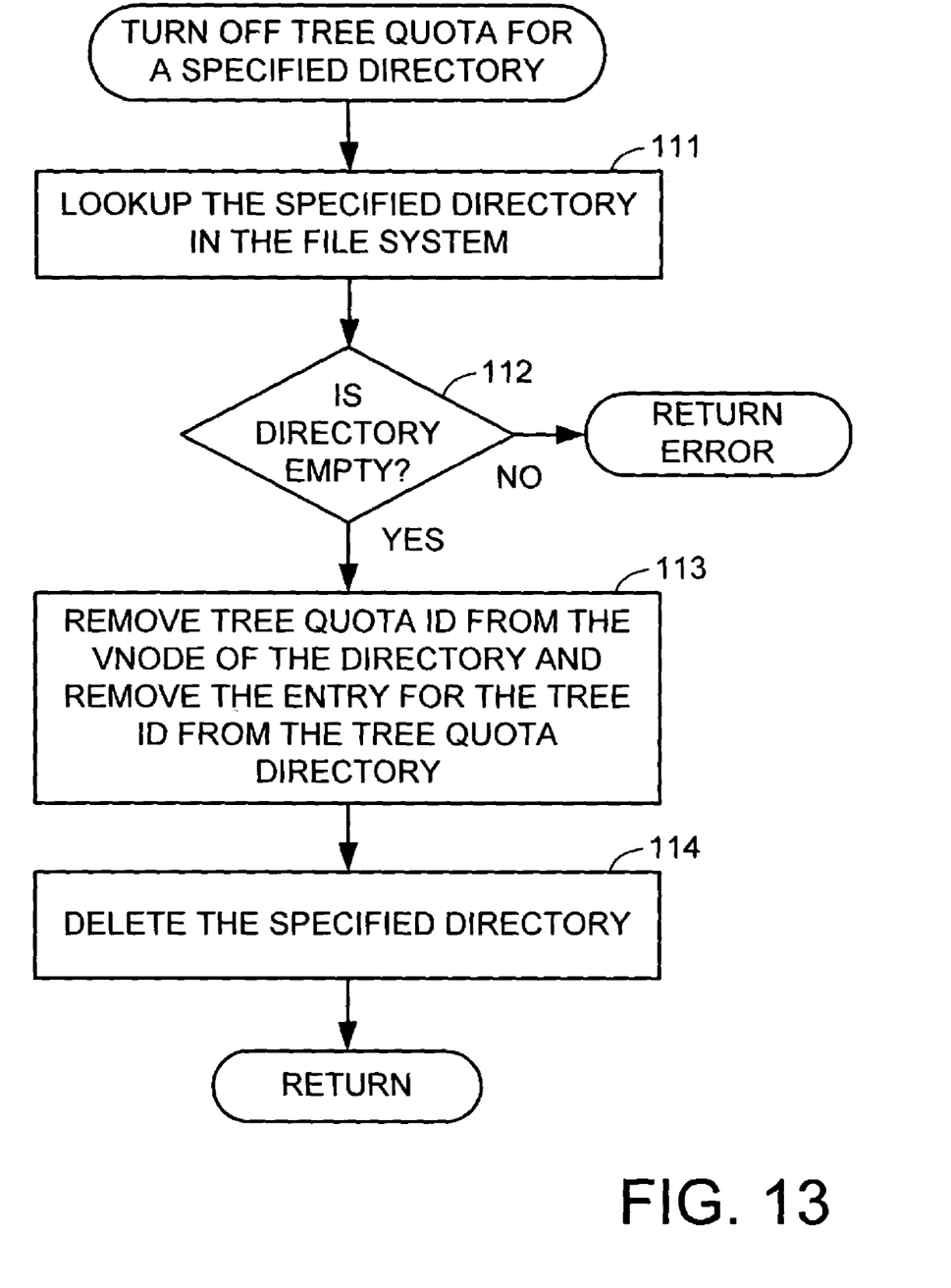
FIG. 13 is a flowchart of a procedure for turning off the tree quota for a specified directory.

FIG. 13 shows a procedure for turning off the tree quota for a specified directory. This involves an issue of what should be done with previously-issued file handles having such a quota tree turned on. It is desired that the quota tree ID in any previously issued file handle for such a quota tree will not be considered valid. A preferred way of handling this situation is to permit the tree quota for a specified directory to be turned off only when deleting the root directory of the quota tree. Every other file in the quota tree would also be deleted, because a conventional file system requires a directory to be empty before the directory can be deleted. In this case, any previously issued file handle would be found to be invalid because the inode identified by the file handle would no longer exist and would not be found in step 81 of FIG. 11.

As shown in FIG. 13, in a first step 111, the file system hierarchy is searched for the specified directory. In step 112, if the directory is not found to be empty, execution returns with an error. Otherwise, execution continues to step 113. In step 113, the tree quota ID is removed from the vnode of the directory, and the entry for the tree ID is removed from the tree quota directory. Finally, in step 114, the specified directory is deleted. After step 114, execution returns.

For certain applications, it may be desirable to use an NFS version 3 function called "Readdirplus( )" to get vnodes and then get the attributes to send back to the client. If this function is used, care should be taken to not return the tree quota ID to the node of ".." of a quota tree root directory. The ".." entry is the parent of the directory. Even if a lookup("..") seems to return the child of a directory, it is the parent. Care should be taken for the special case of a quota tree root to ensure that the tree quota tree ID does not inadvertently become set for the parent node.

In view of the above, there has been described a method of maintaining quotas for selected directory trees of a file system. To avoid the need for storing a tree quota identifier attribute for every file in a quota tree, a tree quota identifier is included in the file handle returned by the file server to a client in response to a directory lookup request. In response to the directory lookup request, the file server discovers that the file is in a quota tree when searching the file system hierarchy along a path specified by the file pathname and finding that the root directory of the quota tree has a tree quota identifier as an attribute. The client includes the file handle in any request for accessing the file. The file server responds to a client request for changing the storage resources used by the file by inspecting the file handle and upon finding the tree quota identifier in the file handle, using the tree quota identifier to index a tree quota database to find usage and limits for the tree quota. The file server checks the limits against any increase in the storage resources for the file, and updates the usage.

What is claimed is:

1. A method of maintaining quotas for storage resources used by a file server for storing files in selected directory trees of a file system, the method including:
   (a) the file server responding to a client request specifying a file in the file system by performing a search for the file in the file system, and upon finding that the file is in a directory tree having a quota of the storage resources, returning a file handle including a tree quota identifier identifying the quota of the directory tree;
   (b) the file server responding to a client request for increasing storage resources used by the file, the client request for increasing storage resources used by the file including the file handle, the file server responding to the client request for increasing storage resources used by the file by inspecting the file handle and upon finding the tree quota identifier in the file handle, using the tree quota identifier to find the quota identified by the tree quota identifier, and checking whether the client request for increasing storage resources used by the file can be satisfied without exceeding the quota identified by the tree quota identifier.

2. The method as claimed in claim 1, which includes the file server maintaining a quota tree database of the quotas for the selected directory trees, and wherein the tree quota identifier is an index into the quota tree database for a database entry for the quota identified by the tree quota identifier.

3. The method as claimed in claim 2, wherein the database entry indexed by the tree quota identifier includes a file handle for a root directory of the directory tree having the quota identified by the tree quota identifier, a usage value specifying an amount of the storage resources presently used for storing files in the directory tree having the quota identified by the tree quota identifier and at least one limit value specifying the quota of storage resources for storing files in the directory tree having the quota identified by the tree quota identifier.

4. The method as claimed in claim 1, which further includes the file server responding to a request to establish a tree quota for a specified directory in the file system by searching the file system for the specified directory, and returning an error upon finding that the specified directory is included in a directory tree already having a tree quota.

5. The method as claimed in claim 1, which further includes the file server responding to a request to establish a tree quota for a specified directory in the file system by searching the file system for the specified directory, and returning an error upon finding that the specified directory is already present.

6. The method as claimed in claim 1, which further includes the file server responding to a request to establish a tree quota for a specified directory in the file system by creating the specified directory and associating a tree quota identifier with the specified directory.

7. The method as claimed in claim 1, which further includes the file server responding to a request to establish a tree quota for a specified directory in the file system by storing a unique tree quota identifier in a node of the directory, the node of the directory and the unique tree quota identifier later being accessed during a search through the file system for a file in the specified directory.

8. The method as claimed in claim 7, which includes the file server pinning the node of the specified directory in a file system cache memory.

9. The method as claimed in claim 7, which includes the file server storing the unique tree quota identifier in an entry of a tree quota database, the entry of the tree quota database also including at least one limit value specifying a quota of storage resources used by the file server for storing files in a directory tree having the specified directory as its root directory.

10. The method as claimed in claim 1, which further includes the file server responding to a client request for changing the size of a specified file, the client request for changing the size of including a file handle for the specified file, the file server responding to the client request for changing the size of the specified file by inspecting the file handle for the specified file and upon finding a tree quota identifier in the file handle for the specified file, using the tree quota identifier for the specified file to find a usage for the quota identified by the tree quota identifier for the specified file, and updating the usage for quota identified by the tree quota identifier for the specified file.

11. The method as claimed in claim 1, which further includes the file server responding to a request to rename a specified file in the file system from an old file name to a new file name, and upon finding that the old file name is in a directory tree having a quota of the storage resources and the new file name is not in the same directory tree having the quota of storage resources as the old file name, returning an error.

12. The method as claimed in claim 1, which further includes the file server responding to a request to turn off a tree quota for a specified directory in the file system by searching for the specified directory in the file system, and upon finding that the specified directory is not empty, returning an error.

13. The method as claimed in claim 1, which further includes the file server responding to a request to turn off a tree quota for a specified directory in the file system by deleting the specified directory.

14. A method of maintaining quotas for storage resources used by a file server for storing files in selected directory trees of a file system, the file server having a tree quota database of usage values of the storage resources and limit values for the storage resources for the selected directory trees of the file system, the usage values and limit values being indexed by tree quota identifiers associated with root directories of the selected directory trees, the method including:
   (a) the file server responding to a client request specifying a file in the file system by performing a search for the file in the file system, and upon finding that the file is in a directory tree having a quota of the storage resources, returning a file handle including a tree quota identifier identifying the quota of the storage resources;
   (b) the file server responding to a client request for increasing storage resources used by the file, the client request for increasing storage resources used by the file including the file handle, the file server responding to the client request for increasing storage resources used by the file by inspecting the file handle and upon finding the tree quota identifier in the file handle, using the tree quota identifier to index the tree quota database to find the quota identified by the tree quota identifier, and checking whether the client request for increasing storage resources used by the file can be satisfied without exceeding the limit value of the quota identified by the tree quota identifier; and when the client request for increasing storage resources used by the file can be satisfied without exceeding the limit value of the quota identified by the tree quota identifier, increasing the usage for the quota identified by the tree quota identifier, and satisfying the client request.

15. A file server comprising:
storage for storing a file system; and
a processor programmed for responding to client requests for access to the file system and for maintaining quotas for storage resources used for storing files in selected directory trees of the file system,
wherein the processor is programmed for responding to a client request specifying a file in the file system by performing a search for the file in the file system, and upon finding that the file is in a directory tree having a quota of the storage resources, returning a file handle including a tree quota identifier identifying the quota of the storage resources; and
wherein the processor is programmed for responding to a client request for increasing storage resources used by the file, the client request for increasing storage resources used by the file including the file handle, and the processor is programmed for responding to the client request for increasing storage resources used by the file by inspecting the file handle and upon finding the tree quota identifier in the file handle, using the tree quota identifier to find the quota identified by the tree quota identifier, and checking whether the client request for increasing storage resources used by the file can be satisfied without exceeding the quota identified by the tree quota identifier.

16. The file server as claimed in claim 15, which includes a quota tree database of the selected directory trees of the file system having the quotas for the storage resources, and wherein the tree quota identifier is an index into the quota tree database for a database entry for the quota identified by the quota tree identifier.

17. The file server as claimed in claim 16, wherein the database entry indexed by the tree quota identifier includes a file handle for a root directory of the directory tree having the quota identified by the tree quota identifier, a usage value specifying an amount of the storage resources presently used for storing files in the directory tree having the quota identified by the tree quota identifier and at least one limit value specifying the quota identified by the tree quota identifier.

18. The file server as claimed in claim 15, wherein the processor is programmed for responding to a request to establish a tree quota for a specified directory in the file system by searching the file system for the specified directory, and returning an error upon finding that the specified directory is included in a directory tree already having a tree quota.

19. The file server as claimed in claim 15, wherein the processor is programmed for responding to a request to establish a tree quota for a specified directory in the file system by searching the file system for the specified directory, and returning an error upon finding that the specified directory is already present.

20. The file server as claimed in claim 15, wherein the processor is further programmed for responding to a request to establish a tree quota for a specified directory in the file system by creating the specified directory and associating a tree quota identifier with the specified directory.

21. The file server as claimed in claim 15, wherein the processor is programmed for responding to a request to establish a tree quota for a specified directory in the file system by storing a unique tree quota identifier in a node of the directory, the node of the directory and the unique tree identifier later being accessed during a search through the file system for a file in the specified directory.

22. The file server as claimed in claim 21, wherein the processor has a file system cache memory, and wherein the processor is programmed for pinning the node of the specified directory in the file system cache memory.

23. The file server as claimed in claim 21, wherein the processor is programmed for storing the unique tree identifier in an entry of a tree quota database, the entry of the tree quota database also including at least one limit value specifying a quota of storage resources used by the file server for storing files in a directory tree having the specified directory as its root directory.

24. The file server as claimed in claim 15, wherein the processor is further programmed for responding to a client request for changing the size of a specified file, the client request for changing the size of including a file handle for the specified file, the file server responding to the client request for changing the size of the specified file by inspecting the file handle for the specified file and upon finding a tree quota identifier in the file handle for the specified file, using the tree quota identifier for the specified file to find a usage for the quota tree identified by the tree quota identifier for the specified file, and updating the usage for the quota tree identified by the tree quota identifier for the specified file.

25. The file server as claimed in claim 15, wherein the processor is further programmed for responding to a request to rename a specified file in the file system from an old file name to a new file name, and upon finding that the old file name is in a directory tree having a quota of the storage resources and the new file name is not in the same directory tree having the quota of storage resources as the old file name, returning an error.

26. The file server as claimed in claim 15, wherein the processor is further programmed for responding to a request to turn off a tree quota for a specified directory in the file system by searching for the specified directory in the file system, and upon finding that the specified directory is not empty, returning an error.

27. The method as claimed in claim 15, wherein the processor is further programmed for responding to a request to turn off a tree quota for a specified directory in the file system by deleting the specified directory.

28. A file server comprising:
storage for storing a file system; and
a processor programmed for responding to client requests for access to the file system and for maintaining quotas for storage resources used for storing files in selected directory trees of the file system,
wherein the processor is programmed for maintaining a tree quota database of usage values of the storage resources and limit values for the storage resources for the selected directory trees of the file system, the usage values and limit values being indexed by tree quota identifiers associated with root directories of the selected directory trees;
wherein the processor is programmed for responding to a client request specifying a file in the file system by performing a search for the file in the file system, and upon finding that the file is in a directory tree having a quota of the storage resources, returning a file handle including a tree quota identifier identifying the quota of the storage resources; and wherein the processor is programmed for responding to a client request for increasing storage resources used by the file, the client request for increasing storage resources used by the file including the file handle, and the processor is programmed for responding to the client request for increasing storage resources used by the file by inspecting the file handle and upon finding the tree quota identifier in the file handle, using the tree quota identifier to index the tree quota database to find the quota identified by the tree quota identifier, and checking whether the client request for increasing storage resources used by the file can be satisfied without exceeding the quota of storage resources for storing files in the directory tree identified by the tree quota identifier; and when the client request for increasing storage resources used by the file can be satisfied without exceeding the limit value of the quota identified by the tree quota identifier, increasing the usage for the quota identified by the tree quota identifier, and satisfying the client request.

* * * * *